(12) United States Patent
Bernardin et al.

(10) Patent No.: US 11,511,922 B1
(45) Date of Patent: Nov. 29, 2022

(54) ADDITIVELY MANUFACTURED TAMPER EVIDENT CONTAINER

(71) Applicant: TRIAD NATIONAL SECURITY, LLC, Los Alamos, NM (US)

(72) Inventors: John D. Bernardin, Los Alamos, NM (US); Alexandria N. Marchi, Los Alamos, NM (US); David D. L. Mascarenas, Los Alamos, NM (US); Alessandro Cattaneo, Los Alamos, NM (US); Jack Gioia, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 664 days.

(21) Appl. No.: 16/509,443

(22) Filed: Jul. 11, 2019

Related U.S. Application Data

(60) Provisional application No. 62/696,790, filed on Jul. 11, 2018.

(51) Int. Cl.
*B65D 55/02* (2006.01)
*G06Q 10/08* (2012.01)
*G06K 19/077* (2006.01)
*B33Y 80/00* (2015.01)

(52) U.S. Cl.
CPC ..... *B65D 55/028* (2013.01); *G06K 19/07798* (2013.01); *G06Q 10/0833* (2013.01); *B33Y 80/00* (2014.12); *B65D 2203/10* (2013.01); *B65D 2401/00* (2020.05)

(58) Field of Classification Search
None
See application file for complete search history.

(56) References Cited

U.S. PATENT DOCUMENTS

2007/0251911 A1* 11/2007 Russell ............. B65D 41/0414
215/344
2012/0235791 A1* 9/2012 Donlan ............. G06Q 10/0833
340/10.1

FOREIGN PATENT DOCUMENTS

WO WO-2018028072 A1 * 2/2018

* cited by examiner

*Primary Examiner* — Adolf Dsouza
(74) *Attorney, Agent, or Firm* — Lewis Roca Rothgerber Christie LLP

(57) ABSTRACT

A tamper evident container includes a container body having walls surrounding a cavity. The walls are composed of a non-electrically conductive material and at least one integrity sensor that is embedded in the non-electrically conductive material. A monitoring circuit is configured to monitor the tamper evident container using the at least one integrity sensor and determine a state-of-health of the tamper evident container.

10 Claims, 7 Drawing Sheets

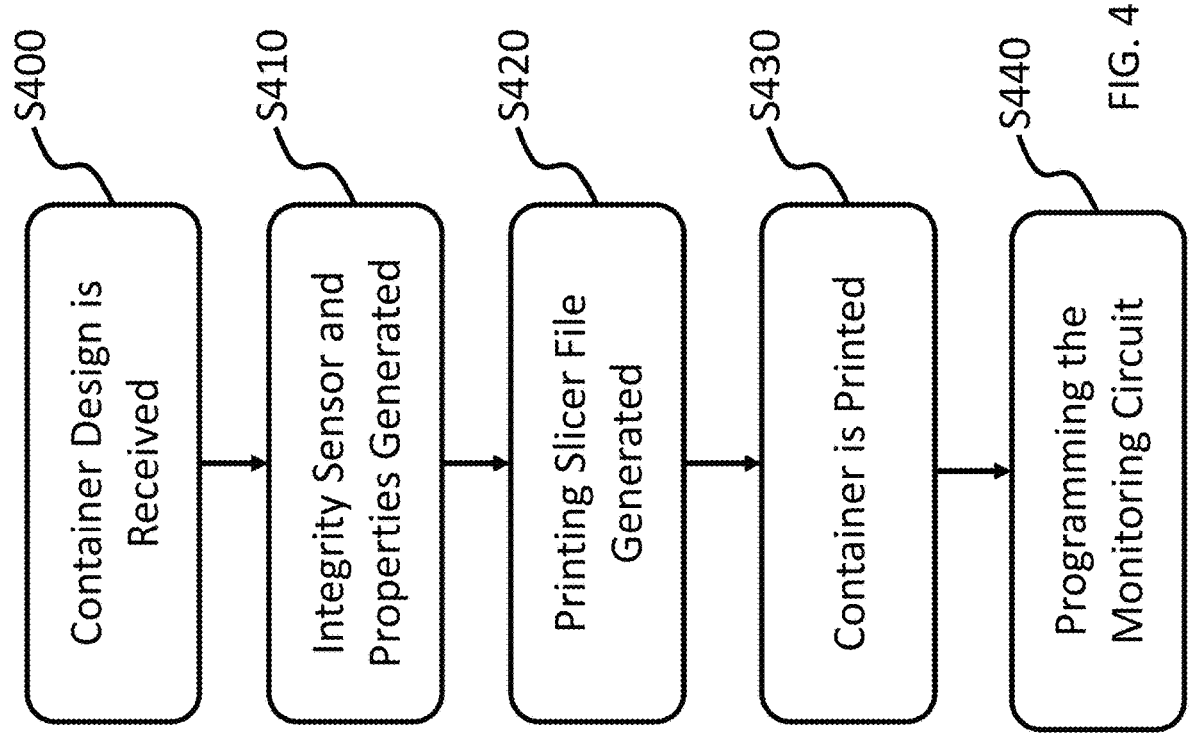

ADDITIVELY MANUFACTURED TAMPER EVIDENT CONTAINER

CROSS-REFERENCE TO RELATED APPLICATION

The present application claims priority to and the benefit of Provisional Application No. 62/696,790, filed on Jul. 11, 2018, entitled "TAMPER EVIDENT CONTAINER", the entire content of which is incorporated herein by reference.

STATEMENT REGARDING FEDERALLY SPONSORED RESEARCH OR DEVELOPMENT

The United States government has rights in this invention pursuant to Contract No. 89233218CNA000001 between the United States Department of Energy/National Nuclear Security Administration and Triad National Security, LLC for the operation of Los Alamos National Laboratory.

BACKGROUND

1. Field

Embodiments of the present invention relate to a tamper resistant and evident container.

2. Description of the Related Art

Tamper evident seals are used across a number of industries to provide an indication of whether a container has been tampered with. Containers with tamper evident seals are often associated with food, medicine, and other everyday articles. In some instances, tamper evident seals are used on containers storing sensitive or confidential information. Tamper evident containers generally include one-time use seals or a breach indicator, that once opened, cannot be resealed or indicate that the seal has been broken. Typically, the available tamper evident solutions only protect a single or a few points of the container (e.g., a seal of a food container lid or medicine bottle).

More robust tamper evident containers are needed in higher security industries. For example, the protection of physical assets from adversarial disclosure is a high priority in today's environment of government and industrial espionage. Furthermore, knowledge of the security history and monitoring for potential adverse acquisition or disclosure of the protected assets is also important. Furthermore, the containers could be tamper resistant, to prevent, discourage, or minimize access to the container and its contents.

SUMMARY

Aspects of embodiments of the present invention relate to a tamper resistant and evident container and a method of manufacturing a tamper resistant and evident container.

In various embodiments, a tamper evident container includes a container body having walls surrounding a cavity. The walls may include a non-electrically conductive material and at least one integrity sensor embedded in the non-electrically conductive material. The tamper evident container further includes a monitoring circuit configured to monitor the tamper evident container using the at least one integrity sensor and determine a state-of-health.

In various embodiments, the at least one integrity sensor includes a first conductive filament having a first resistance and a second conductive filament having a second resistance.

In various embodiments, the first conductive filament has a first length and the second conductive filament has a second length that is different than the first length.

In various embodiments, the first conductive filament has a first thickness and the second conductive filament has a second thickness that is different from the first thickness.

In various embodiments, the first conductive filament comprises at least one of a variable thickness and a variable material composition.

In various embodiments, the monitoring circuit includes a resistance monitoring circuit configured to measure the resistance of the at least one integrity sensor, and determine the state-of-health of the tamper evident container.

In various embodiments, the monitoring circuit further includes an accelerometer, a global positioning system circuit, at least one anti-probing sensor configured to determine a probing attack on the tamper evident container, and a connectivity circuit. In various embodiments, at least one of an output of the accelerometer, an output of the global positioning system circuit, and an output of the anti-probing sensor are used to determine the state-of-health, and wherein the connectivity circuit is configured to provide an output regarding the state-of-health to a separate device.

In various embodiments, the monitoring circuit includes at least one countermeasure and the monitoring circuit is configured to activate the countermeasure based upon the state-of-health.

In various embodiments, a tamper evident container includes a container body having a bottom, a sidewall, and a top that surround a cavity. In various embodiments, the container body is composed of a non-electrically conductive material and at least one integrity sensor embedded in the non-electrically conductive material. In various embodiments, the tamper evident container further includes a monitoring circuit configured to monitor the tamper evident container by measuring a resistance of each of the at least one integrity sensor and determine a state-of-health of the tamper evident container based on each resistance.

In various embodiments, the at least one conductive filament includes a path generated using a space-filling, self-avoiding, random walk algorithm.

In various embodiments, the tamper evident container further includes a first contact pad on the sidewall and a second contact pad on the top, wherein the first contact pad and the second contact pad are configured to electrically connect a first integrity sensor located in the sidewall to a second integrity sensor located in the top.

In various embodiments, the first integrity sensor has a first length and the second integrity sensor has a second length that is different than the first length.

In various embodiments, the first integrity sensor has a first thickness and the second integrity sensor has a second thickness that is different from the first thickness.

In various embodiments, the first integrity sensor has at least one of a variable thickness and a variable material composition.

In various embodiments, the monitoring circuit includes a resistance monitoring circuit connected to the at least one integrity sensor and is configured to measure the resistance of each of the at least one integrity sensor to determine the state-of-health.

In various embodiments, the monitoring circuit further includes an accelerometer and a global positioning system circuit. In various embodiments, an output the accelerometer and an output of global positioning system circuit are used to determine the state-of-health. In various embodiments, the monitoring circuit further includes at least one countermeasure and the monitoring circuit is configured to activate the countermeasure based upon the state-of-health In various embodiments, the monitoring circuit includes at least one anti-probing sensor configured to determine a probing attack on the tamper evident container, and the monitoring circuit is configured to update the state-of-health according to an occurrence of the probing attack.

In various embodiments, a method of manufacturing a tamper evident container includes: receiving a tamper evident container shape; generating at least one conductive trace patterns for placement in a wall of the tamper evident container shape; and building the tamper evident container shape using an additive layer technique that integrates the at least one conductive trace into a wall of the tamper evident container.

In various embodiments, generating at least one conductive trace pattern includes using a space-filling, self-avoiding, random walk algorithm to generate each of the at least one conductive trace patterns.

In various embodiments, the method further includes programming a monitoring circuit of the tamper evident container with a resistance of each of the at least one conductive trace.

BRIEF DESCRIPTION OF THE DRAWINGS

Illustrative, non-limiting example embodiments will be more clearly understood from the following detailed description taken in conjunction with the accompanying drawings.

FIG. 4 depicts a method of manufacturing a tamper resistant and evident container according to various embodiments;

DETAILED DESCRIPTION

Figure 1A:
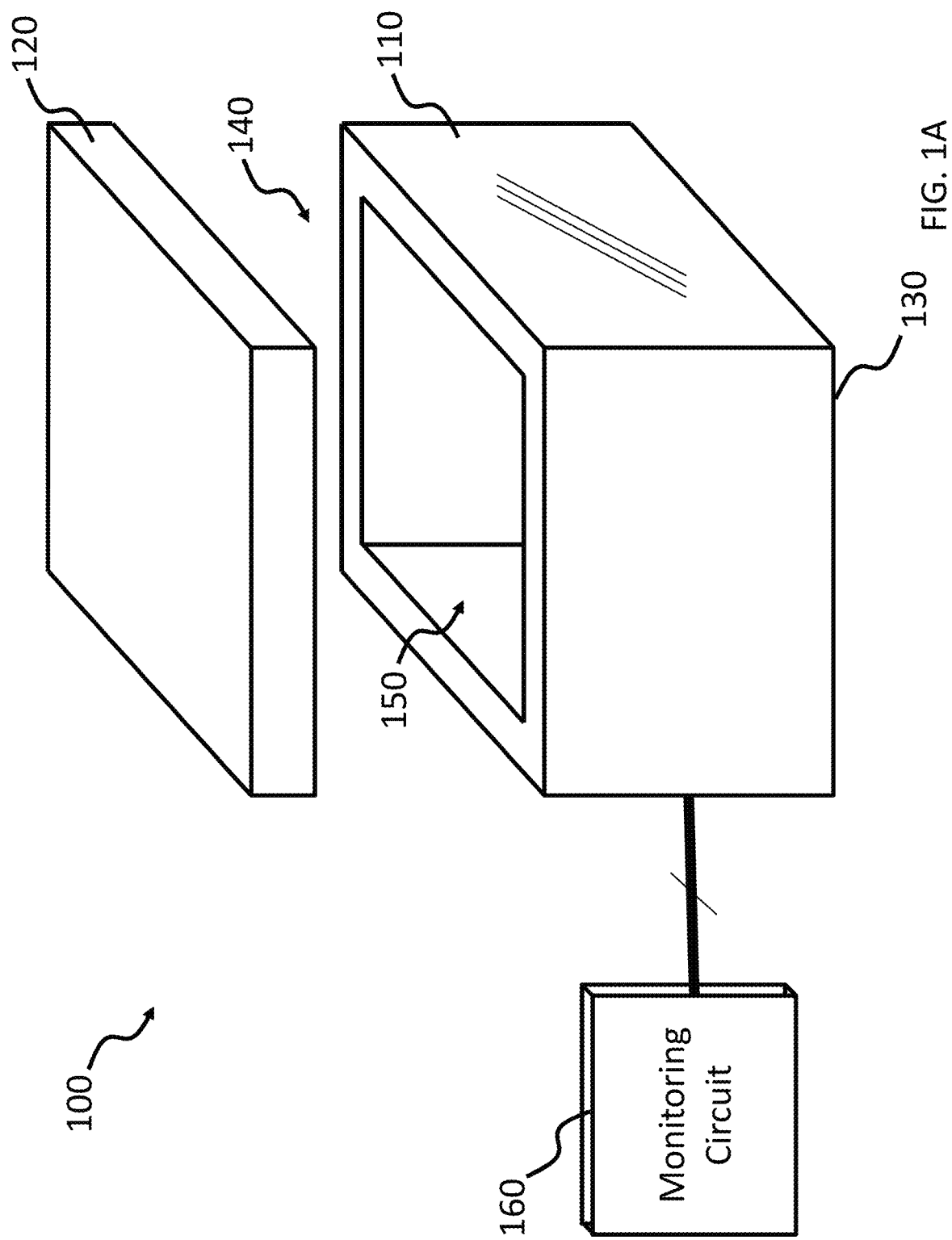
FIG. 1A depicts an example tamper resistant and evident container according to various embodiments.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a hard drive, solid state drive, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a tamper resistant and evident container for protecting assets. The tamper resistant and evident container provides a sealed and protective packaging container that includes a compartment for storing an asset and is configured to monitor both state-of-health of the container and maintain surety. For example, the container may include various components that may be used to monitor the integrity of the container (i.e., state-of-health) as well as to determine if the container has been compromised (e.g., accessed).

In various embodiments, the container may include tamper detecting circuitry that monitors for attempts to access the contents of the container and may also allow for the state-of-health of the container to be assessed. For example, the tamper detection circuitry may include one or more sensors as well as a monitoring circuit configured to monitor the state of the container using the sensors. In various embodiments, the sensors are configured to provide an indication a breach, attempted breach, and/or mistreatment of the container. The sensors may be embedded within the container walls and/or inside the container compartment. The monitoring circuit may also be integrated into the container, mounted inside the container, or may be separate from the container. Any breaches, attempted breaches, or mistreatment of the container may be indicated by the sensors and identified by the monitoring circuit either in real-time or after receipt of the container.

Figure 1B:
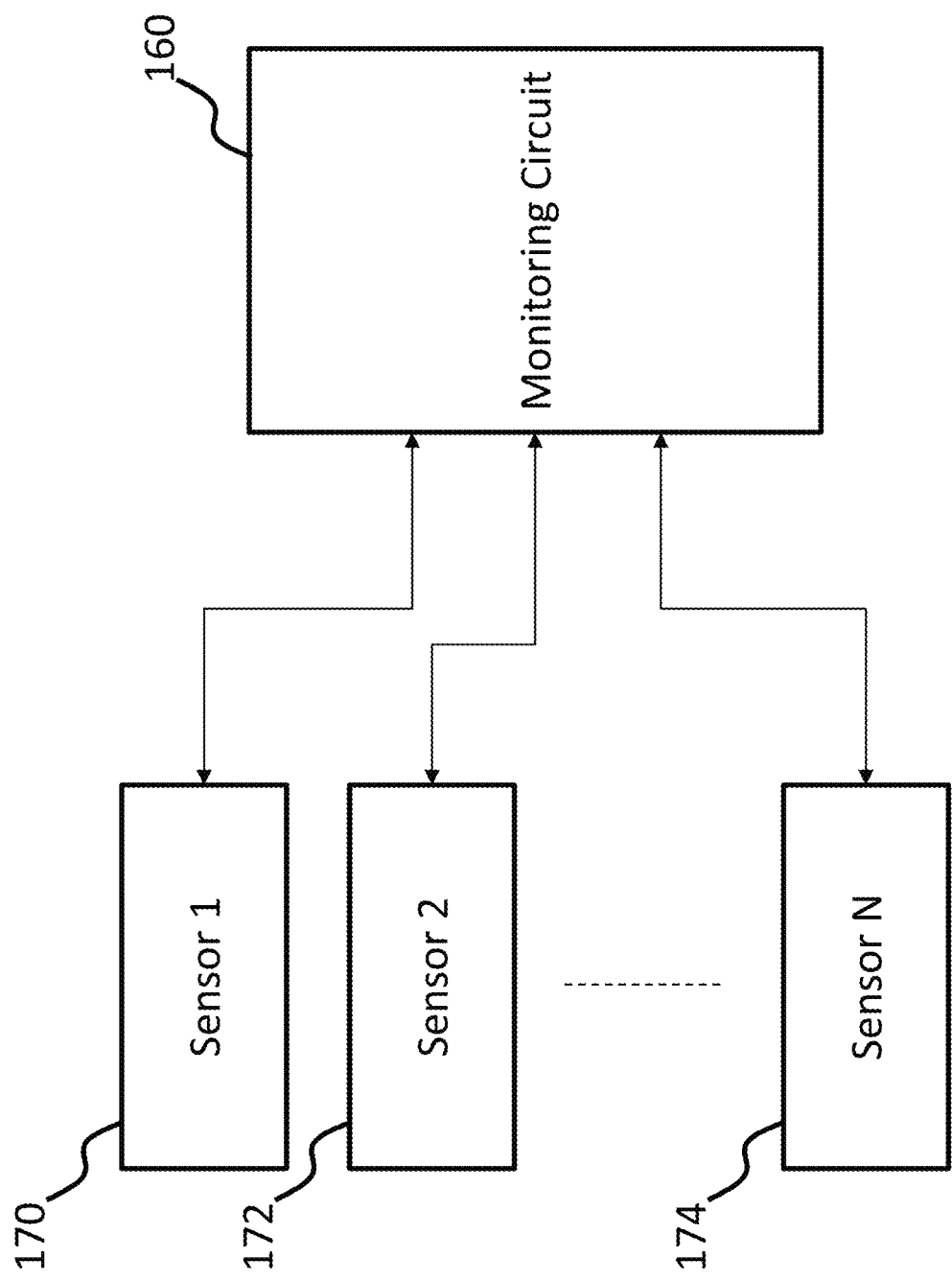
FIG. 1B depicts an example functional block diagram of tamper detecting circuitry according to various embodiments.

FIG. 1A depicts an example tamper resistant and evident container according to various embodiments. FIG. 1B depicts an example functional block diagram of tamper detecting circuitry according to various embodiments.

Referring to FIGS. 1A and 1B, in various embodiments a tamper resistant and evident container 100 provides a secure enclosure and one or more electronic sensors for detecting tampering and/or breach. For example, the container 100 has a body that includes a bottom 130, sidewalls 110 extending from the bottom 130, and a top 120. The top 120, bottom 130, and sidewalls 110 form an opening 140 into a cavity 150 for storing items. The top 120 may be removeably coupled to the sidewalls 110 using a fastening mechanism. For example, the top 120 may be attached to the sidewalls 110 by a hinge and include a locking mechanism for securely fastening the top to the sidewalls and preventing access to the interior of the container 100.

In this example, the container 100 is depicted as a box, however, in other embodiments, the container 100 may have any suitable shape and size and include appropriate hardware for securely closing the container 100 (e.g., a lock, adhesive, one or more fasteners, or any other suitable closing mechanism). For example, in some embodiments, the container may be shaped and sized to accommodate documents and may be similar to an envelope and includes a top that is coupled to a sidewall along with an adhesive for coupling the top to a second sidewall and thereby seal the container. In other embodiments, the container may be shaped and sized to accommodate large objects (e.g., shaped and sized similar to a commercial shipping container or tractor trailer). Thus, the container 100 is not limited to any one shape or size and may include any suitable shape and size for securely holding any desired contents.

In various embodiments, the container 100 is constructed from a durable material and is configured to prevent unauthorized access to the contents of the container (e.g., using a lock or a seal). For example, the container may include one or more layers of a hardened material (e.g., metal such as steel or other alloys, plastics, composites, and/or any other suitable material). In various embodiments, the container 100 may be constructed using a non-electrically conductive structural element. For example, one or more layers of the container 100 may be constructed using a non-conductive durable plastic material while one or more layers may include a conductive metallic material.

In various embodiments, the container 100 includes a monitoring circuit 160 and one or more sensors 170, 172, and 174. In various embodiments, the sensors may include integrity sensors that are integrated into the walls 110, 120, 130 of the container 100. The integrity sensors are configured to transmit and/or receive signals to verify the integrity of the container 100. For example, in various embodiments the integrity sensors may be conductive filaments that are integrated into the walls 110, 120, 130. In various embodiments, the integrity sensors may include fiber optic cables or any other suitable sensor. In other embodiments, the one or more sensors 170, 172, and 174 may include a temperature sensor, an accelerometer, a shock or impact monitor, or any other suitable sensor for detecting intrusion/attempted intrusion into or mistreatment of the container 100. The monitoring circuit 160 is configured to interface with each of the sensors and monitor for any events (e.g., an intrusion into the container, a mishandling of the container, etc.). When an event is detected, the monitoring circuit 160 may log the event and/or provide an output (e.g., set off an alarm, send an electronic notification, self-destruct, etc.). The monitoring circuit 160 may also be used to access the container (e.g., to unlock the container 100) or disarm any countermeasures (e.g., alarms etc.) of the container 100. In various embodiments, the container 100 may also include a unique physical identifier and/or the monitoring circuit 160 may store a unique digital identifier.

Figure 2:
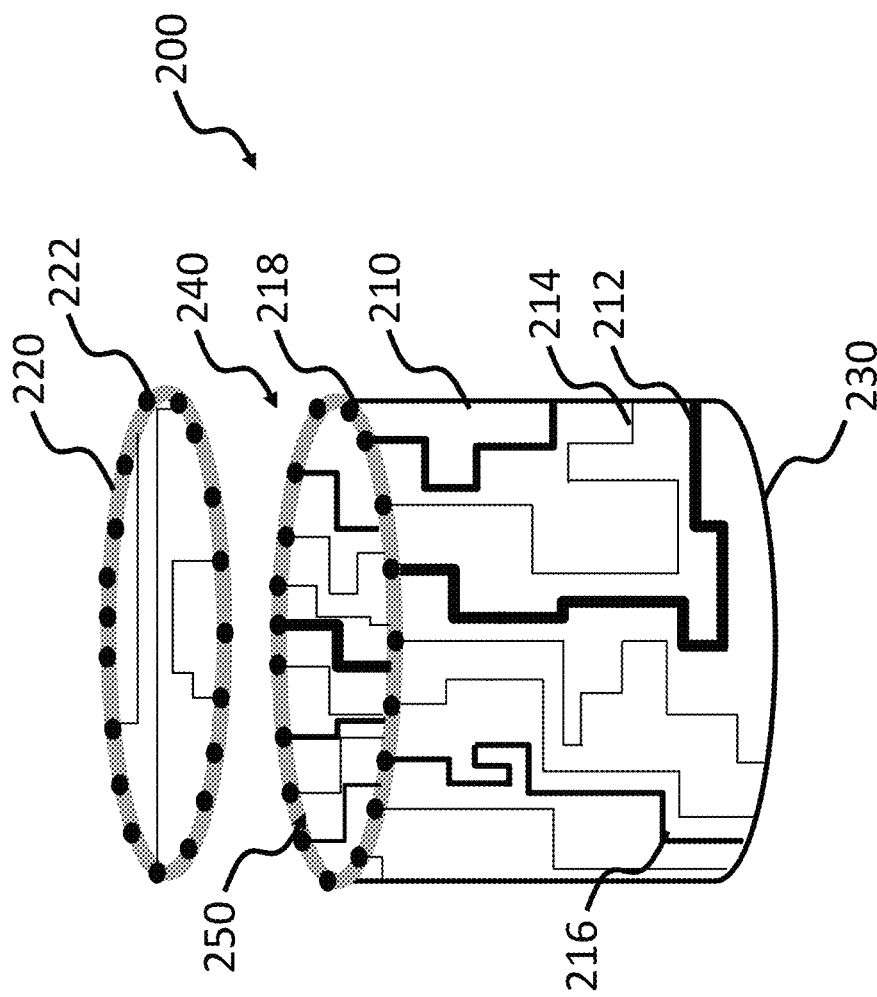
FIG. 2 depicts an example tamper resistant and evident container that includes integrity sensors integrated into the container walls according to various embodiments.

FIG. 2 depicts an example tamper resistant and evident container that includes integrity sensors (e.g., conductive filaments) integrated into the container walls according to various embodiments.

Referring to FIG. 2, in various embodiments the tamper evident container 200 includes a plurality of integrity sensors (e.g., conductive filaments) 212, 214, 216 embedded in the container walls (e.g., the top 220, bottom 230, and sidewalls 210). In various embodiments, the container 200 may include a detachable or semi-detachable side or lid 220 for covering (e.g., securely covering) an opening 240 to an inner cavity 250. The inner cavity 250 is configured to hold any contents to be secured and the opening 240 is similarly configured to facilitate the placement of the contents inside of the cavity 250. In various embodiments, the lid 220 may be configured to be securely attached to the sidewalls 210. For example, a lid 220 may include one or more locks and other parts (e.g., a hinge or flexible connection) for securely fixing the lid to the sidewalls. In other embodiments, the lid 220 may be permanently affixed (e.g., by glue, welds, rivets, or other fastener) to the sidewalls and therefore require at least a partial destruction of the container 200 to access the contents contained in the cavity 250. In various embodiments, the lid 220 and the sidewall 210 may have contact pads 218, 222 for providing an electrical connection between the integrity sensors (e.g., conductive filaments) 212, 214, 216 in the sidewalls 210 and bottom 230, and the integrity sensors in the lid.

In various embodiments, the integrity sensors 212, 214, 216 may be used as both a sensor and a structural component. Thus, a large number of sensors may be built into the container 200 without being detrimental to the packaging. The electrical properties of the conductive filament may then be utilized to detect attempts to breach the container. For example, each conductive filament may have a resistance (e.g., a known resistance) and a warping of the shape of the container 200 (and thus the filament) or a partial or complete breach of the container 200 (e.g. in the sidewall 210, lid 220, or bottom 230), may in turn alter the resistance of the filament. For example, attempting to breach the container 200 may cause the sidewall 210, lid 220, or bottom 230 to flex and thereby alter the size and/or shape of the integrity sensors, thereby causing the electrical properties of the conductive filament to be altered.

The number, shape, and length of the integrity sensors 212, 214, 216 may be selected in order to provide adequate sensor coverage of the container 200. For example, the integrity sensors 212, 214, 216 may be placed such that every area (e.g., 1 square centimeter, 1 square inch, etc.) includes at least one conductive filament passing through it. In various embodiments, the integrity sensors 212, 214, 216 may have unique electrical properties. For example, a first conductive filament 212, a second conductive filament 214, and a third conductive filament 216 may each have a resistance and impedance.

In various embodiments, a monitoring circuit (e.g., the monitoring circuit 160) may be configured to measure (e.g., continuously measure, periodically measure, etc.) the electrical properties (e.g., the resistance and/or impedance) of the integrity sensors, and thereby determine the state-of-health of the container 200 and/or whether the container 200 has been tampered with as will be discussed below. The monitoring circuit may also be configured to utilize other sensors for determining if the container 200 has been tampered with or mishandled.

In various embodiments, the integrity sensors 212, 214, 216 may include a variety of tunable characteristics that effect each filament's electrical properties. For example, the length, thickness, geometry/cross section, and material composition may be varied to provide the container with unique electrical properties. For example, in various embodiments, the thickness of each conductive filament 212, 214, 216 may be varied to modify the electrical properties (e.g., the resistance or impedance) of the conductive filament 212, 214, 216. In some embodiments, each conductive filament 212, 214, 216 may have a relatively constant thickness, while in other embodiments the thickness of the conductive filament 212, 214, 216 may be varied. Furthermore, there is no limitation to the shape of each conductive filament. For example, in various embodiments, the each conductive filament 212, 214, 216 may have a generally cylindrical shape, however, in other embodiments, the integrity sensors 212, 214, 216 may have any suitable shape and may for example include sheets, cuboids, prisms, and any other shapes. Similarly, in some embodiments, the lengths of the integrity sensors may be uniform, while in other embodiments, the lengths of the integrity sensors 212, 214, 216 may be varied. Thus, any sized and shaped integrity sensors 212, 214, 216 may be employed. Furthermore, the composition (e.g., materials) of the conductive filament may be varied to provide another tunable characteristic). In various embodiments, the size and geometry of the integrity sensors 212, 214, 216 may be selected such that each container 100 possesses unique electrical properties (e.g. resistance, impedance, magnetics, etc.). Thus, creating a counterfeit version of the container 100 may be made more difficult.

In various embodiments, the container 200 may include several elements for encryption and authentication and thereby increase the surety of the container 200. For example, the integrity sensors 212, 214, 216 may be randomly generated by varying a path, geometry, and composition of the filament, thus making each container unique with a random electrical resistance for each conductive filament in the tamper evident container. The container 200 may also employ a monitoring circuit (e.g., such as the monitoring circuit 160 of FIG. 1) having a microcontroller and other suitable circuits, and an input mechanism (e.g., either a software-based input from a separate device, or a mechanical input such as a keypad or keyboard). The input mechanism may allow for the input of a password or other unique digital code to allow access to the container and/or communication with the monitoring circuit. For example, in various embodiments, a container access encryption passcode may allow for an operator to communicate with the monitoring circuit (e.g., to communicate with the processor). The container access encryption passcode, may be generated using a time synchronized crypto-card. Once the container access encryption passcode has been entered, a user may be able to identify the container, or may open the container without activating any defense mechanisms. In various embodiments, the unique digital code may be associated with the unique electrical resistances of the corresponding container. Furthermore, data output from the monitoring circuit may be encrypted.

In various embodiments, the integrity sensors 212, 214, 216 may include any conductive material. For example, in various embodiments, the conductive filament s 212, 214, 216 may be constructed out of a conductive metal. In various other embodiments, the integrity sensors 212, 214, 216 may be constructed out of an electrically conductive plastic or polymer.

Figure 3B:
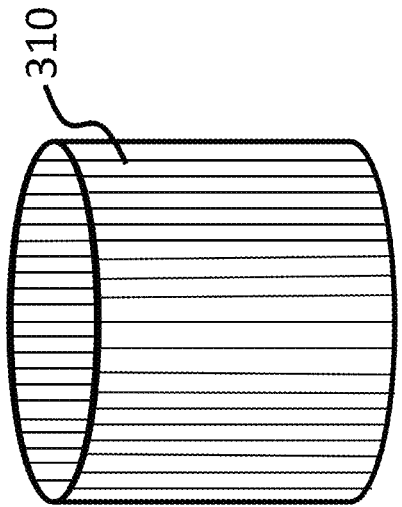
FIGS. 3A-3C depict example tamper resistant and evident containers that include integrity sensors integrated into the container walls according to various embodiments.
Figure 3A:
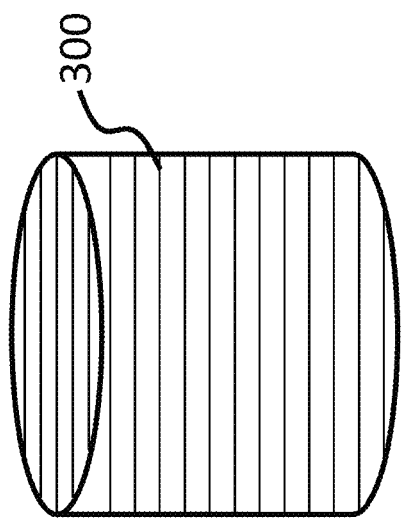
Figure 3C:
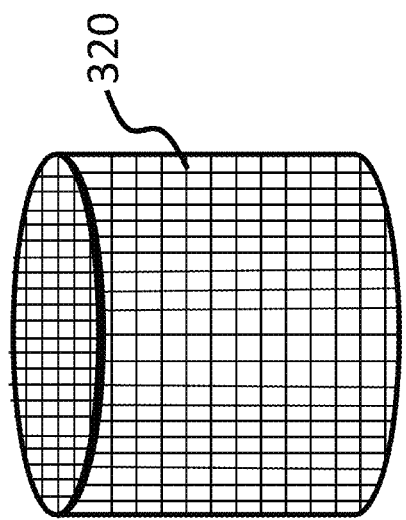

FIGS. 3A-3C depict example tamper resistant and evident containers that include integrity sensors (e.g., conductive filaments) integrated into the container walls according to various embodiments.

Referring to FIGS. 3A-3C, the integrity sensors may be arranged in any shape or pattern and may have varying thicknesses and lengths. For example, the integrity sensors may be arranged in relatively uniform patterns across each surface of the container. For example, in the embodiment of FIG. 3A, the container 300 includes a plurality of horizontal (e.g., parallel to the top and bottom) filaments embedded in the top, bottom, and sidewalls. In another embodiment (e.g., as depicted in FIG. 3B), the container 310 includes a plurality of vertical filaments (e.g., perpendicular to the top and the bottom) embedded in the top, bottom, and sidewalls. In another embodiment (e.g., as depicted in FIG. 3C), the container 320 includes a plurality of horizontal and vertical filaments (e.g., perpendicular to the top and the bottom) embedded in the top, bottom, and sidewalls. In this embodiment, the filaments may not intersect (i.e., not be electrically connected) and may be in different layers of the structure of the container 320, however, in other embodiments, the filaments may intersect (i.e., be electrically connected). As discussed previously, the integrity sensors may be arranged across each surface of the container to ensure that the sensors substantially cover the container. By substantially covering each surface, the sensors can be used to ensure that no portion of the container has been breached and thereby ensure the container's security.

FIG. 4 depicts a method of manufacturing a tamper resistant and evident container according to various embodiments.

Referring to FIG. 4 and with continued reference to FIGS. 1-3C, in various embodiments, the container 100, 200, 300-320 may be fabricated using 3D printing or other additive-like manufacturing techniques. For example, a design of the container 100, 200, 300-320 may be provided (e.g., designed using a using a commercial computer-aided design (CAD) software and a stereolithography (STL) file is generated) (S400). In various embodiments, an application may be configured to determine the location and properties of the traces (S410). The application may be operating on computer workstation or any other suitable computing device capable editing the container design. For example, a 3D printer may operate the application independent form user intervention. However, in various embodiments, a user may modify the generated traces or may design one or more of the traces. A 3D printing slicer file may then be generated for input to a 3D printer (S420). The container 100, 200, 300-320 may then be printed using the 3D printer (S430). The resistance of the conductive traces may be measured or simulated and the monitoring circuit may be programmed with the resistance values (S440). The 3D printer may be configured to utilize multiple printing materials to produce a container having a body composed of a non-electrically conductive material with the integrated conductive traces composed of an electrically conductive plastic or metal. Thus, the container 100, 200, 300-320 may have a substantially continuous and dense electrical detector circuit (e.g., integrity sensors) throughout the container's walls. In other embodiments, the non-conductive portions of the container may be 3D printed using a stereolithography machine and soft, non-cured material may be blown out to provide passages (e.g., hollow traces) for integrity sensors. These hollow traces may then be filled with a conductive liquid (e.g., conductive ink, a melted metal, etc.) or wire to provide the integrity sensors. It should be understood that the container 100, 200, 300-320 may be fabricated using any other suitable manufacturing techniques and that the provided techniques are not limiting. The container 100, 200, 300-320 could be formed from layers of prefabricated non-conductive material, between which are layers containing conductive traces. The conductive trace layers could be formed by electro-etching or deposition of metal on nonconductive substrates or 3D printing the conductive traces on a non-conductive substrate. The resulting layers could be bonded together by ultrasonic methods, hot pressing, application of adhesives, or clamping devices.

In various embodiments, additional layers of material may be added to the container 100, 200, 300-320 to further protect against an attacker attempting to probe or sense the geometry of the conductive traces. For example, an attacker may try to probe or sense the geometry of the conductive traces with pulsed thermal imaging or with x-ray imaging. Thus, the outer surface of the container 100, 200, 300-320 may be coated with a layer to combat such probing, for example, with a conductive plastic.

In various embodiments, the conductive trace patterns are designed and 3D printed using a space-filling, self-avoiding, random walk algorithm that is configured to determine a path for each conductive filament that ensures that the integrity sensors make a grid (e.g., a dense grid) which is sensitive to intrusion attempts through the container. The total electrical resistance of each conductive trace may be determined by the length and the cross-section of the trace, as well as the composition of the conductive filament. The cross-section of each trace (and composition of the filament) can be changed during the 3D printing process in order to break homogeneity in the conductive traces. Breaks in the traces' homogeneity are desirable as they are detrimental to reverse engineering approaches aiming at estimating the electrical resistance of the traces based on direct or indirect imaging techniques (e.g. x-ray tomography, ultrasound spectroscopy and time-of-flight thermal imaging etc.). The unique electrical footprint of each container 100, 200, 300-320 may be combined with specialized circuitry and/or microcontroller units for authentication and tampering detection purposes with increasing levels of sophistication.

In another example embodiment, the tunable tampering-sensitive electrical properties of the 3D printed circuit and the embedded microcomputer/microcontroller could be coupled to implement a compressive sampling architecture. The seal would act as a physical non-bit sensitive encryption key to be used for authentication purposes with robustness to small electrical properties changes in the 3D printed circuit induced by normal environmental exposure.

In various embodiments, data encryption based upon time reversal transformation may be used. For example, X may be a matrix with elements xi, where each element xi represents an interval of electrical resistances for a conductive trace. For example, the matrix X may include data for four conductive traces and interval 1 (×1) may include the resistances of [10 kΩ, 20 kΩ], interval 2 (×2) may include the resistances of [50 kΩ, 100 kΩ], interval #3 (×3) may include the resistances of [200 kΩ, 400 kΩ], and interval #4 (×4) may include the resistances of [600 kΩ, 800 kΩ]. In these embodiments, the conductive traces are 3D printed in order to have a nominal electrical resistance that falls within a corresponding intervals. Because the intervals are fairly large, changes in the electrical resistance induced by environmental changes (e.g. temperature and humidity) will not cause a given conductive trace to depart from the electrical resistance interval to which its nominal value was originally belonging. For example, a major event such as a tampering attack or container mishandling may be the only way to cause such a dramatic change in the electrical resistance of a conductive trace.

In various embodiments, each electrical resistance intervals described above may represent a state of a corresponding conductive traces The monitoring circuit may be configured to measure the resistance of each conductive trace (e.g., constantly, at regular intervals, and/or at irregular intervals) and to thereby determine the state of each conductive trace. For example, a matrix Y may be used to store information about the state (e.g., the resistance) of the conductive traces. A known encryption key function f may be used to transform Y into a new matrix Y*. The transformed state Y* therefore becomes unintelligible to a third-party attacker. In various embodiments, the encryption key function f may be a totality function. For example, the totality function may be defined as the sum over the eight nearest neighbors of xij and xij itself as shown in Equation 1 below:

$$\theta[\{x_{ij}\}] = x_{i-1,j-1} + x_{i,j-1} + x_{i+1,j-1} + x_{i-1,j} + x_{i,j} + x_{i-1,j+1} + x_{i,j+1} + x_{i+1,j+1} \quad (1)$$

In this embodiment, data is encrypted by iterating an arbitrary number of time steps. The time reversal transformation defined by Equation 2:

$$x_{ij}(T+1) = f[\{x_{ij}(T)\}] - x_{ij}(T-1) \bmod k \quad (2)$$

where T labels the Tth copy of the sequence xij and k is the number of states.

In various embodiments, the container 100, 200, 300-320 may include any number of traces. For example, in various embodiments, a container may have a total of 9 conductive traces. If the states of each conductive trace are arranged in a 3×3 matrix and the eight neighbors of each conductive trace are used in the construction of the key, the number of distinct function that should be guessed to decipher the encoded message would be $4^{(4^9)}$, which is equal to 2.596E+157826. This includes two initial conditions $x_{ij}(0) = b_{ij}$ and $x_{ij}(0) = c_{ij}$ where $c_{ij}$ are the data to be encrypted (i.e. the nominal state of each conductive trace), and $b_{ij}$ are an arbitrary initialization state.

In various embodiments, the monitoring circuit 160 or a portion of the monitoring circuit 160 may be located under the lid 120. In various embodiments, the monitoring circuit 160 may require an authorized user to provide various inputs before being granted access to the container 100. For example, the container lid 120 or the container sidewalls 110 may include a keypad for providing user input and the lid 120 and/or the sidewalls 110 may include an electronic locking mechanism for preventing the opening of the container 100. In other embodiments, the user may utilize a wired or wireless connection to connect to the monitoring circuit 160 to provide input. In various embodiments the input may include, a sequence of initialization states the nominal resistance value of each conductive filament, and/or the position occupied by each nominal resistance value in the matrix X.

Once the authorized user has entered the 3 pieces of information, the monitoring circuit 160 can save (e.g., temporarily save) the information and the data encryption algorithm may continue running even if the lid 120 is removed. For example, if the lid 120 is not put back in place after a time interval (e.g., a predefined time interval) has elapsed, the monitoring circuit 160 may trigger an alarm or other countermeasures. In some alternative embodiments, other encryption algorithms may be used as would be well understood by those skilled in the art.

Figure 5:
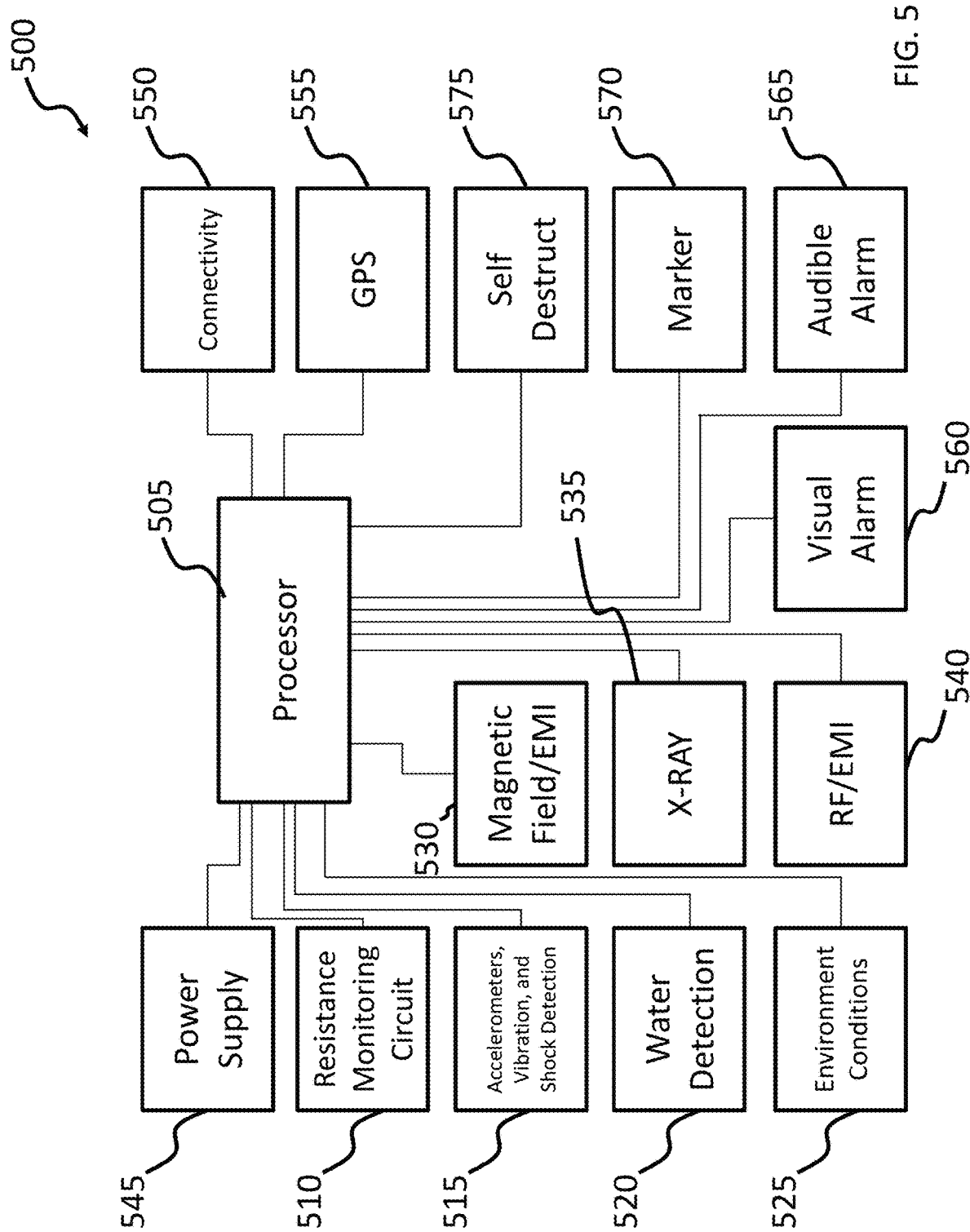
FIG. 5 depicts a block diagram of a monitoring circuit according to various embodiments.

FIG. 5 depicts a block diagram of a monitoring circuit according to various embodiments.

Referring to FIG. 5 and with continued reference to FIGS. 1-3C, in various embodiments, the container 100, 200, 300-320 may include a monitoring circuit 500 that is configured to determine when the container 100, 200, 300-320 has been tampered with or mishandled. In various embodiments, the monitoring circuit 500 monitors a state of the container 100, 200, 300-320 by using one or more sensors. For example, the resistance monitoring circuit includes a processor or microcontroller 505 and one or more sensors configured to detect intrusion into the container, mistreatment of the container, remote monitoring or scanning of the container and/or the container's contents, and/or various forms of tampering with the container. For example, in various embodiments, the monitoring circuit 500 may include a resistance monitoring circuit 510, an accelerometer or other vibration and/or shock detection circuit 515, a water/humidity sensor 520, a temperature/pressure sensor 525, a magnetic field/EMI sensor 530, an X-ray sensor 535, a radio frequency/EMI sensor 540, and/or any other suitable sensor. The processor 505 may include a persistent memory and a volatile memory for storing and executing instructions to enable the operation of the monitoring circuit 500 as well as any other suitable hardware as would be understood by those skilled in the art.

In various embodiments, the monitoring circuit 500 may also include a power supply 545. In various embodiments, the power supply 545 may include a low voltage DC power supply and battery. In various embodiments, the battery is sized and configured to provide power for the duration of the container's 100, 200, 300-320 use (e.g., transit time between locations). In various embodiments, the battery may be rechargeable and power supply 545 may further include battery charging circuitry.

In various embodiments, the monitoring circuit 500 may include one or more connectivity circuits 550 for connecting to other separate electronic devices such as servers, personal computers, peripheral devices, or any other suitable device. For example, in various embodiments, the connectivity circuit 550 includes wired and/or wireless communications. For example, the connectivity circuit 550 may include circuitry for Wi-Fi, Bluetooth, USB, NFC, cellular, and/or any other suitable type of communications circuitry.

In various embodiments, the monitoring circuit 500 may also include location circuitry for identifying the location of the container 100, 200, 300-320. For example, the location circuitry may include a GPS circuit 555 and a GPS antenna. In various embodiments, alternative location circuitry may also be used. For example, the monitoring circuit may utilize inertial motion circuitry or any other suitable location detecting circuits.

In various embodiments, the monitoring circuit 500 may include one or more countermeasures that may be employed when a breach, attempted breach, probe, or improper environmental condition has been observed. For example, the monitoring circuit 500 may be configured to activate a visual alarm 560 (e.g., a strobe light) or an audible alarm 565 (e.g., a speaker configured to play a relatively loud and irritating sound). In some embodiments, a marker 570 may be deployed (e.g. a permanent ink) to color the attacker or a self-destruct 575 may be initiated to destroy the contents of the container.

In various embodiments, the monitoring circuit 500 includes a resistance monitoring circuit 510 that is monitored by the processor 505. In various embodiments, the resistance monitoring circuit 510 is configured to connect to each of the embedded sensors (e.g. the integrity sensors) in the container 100, 200, 300-320. In various embodiments, a voltage may be continuously or intermittently applied to a first end of the integrity sensors. The resistance monitoring circuit 510 may then process the voltages received at a second end of the integrity sensors. In various embodiments, when the received voltages differ too greatly from expected voltages, the resistance monitoring circuit 510 may be configured to provide an output to the processor 505 indicative of an attack or tampering with the container. In other embodiments, the resistance monitoring circuit 510 may provide the received voltages (e.g., a digital representation of the received voltages) to the processor 505 which may then in turn determine whether container is being attacked.

For example, in various embodiments, the resistance monitoring circuit 510 may include a plurality of comparators for checking the continuity of each of the integrity sensors. In other embodiments, the resistance monitoring circuit 510 includes a plurality of voltage dividers connected to the comparators to determine the resistance of the integrity sensors, however, any suitable continuity or resistance measuring circuits may be used. In various embodiments, if tampering or other damage results in a significant change in the resistance of a conductive filament, a latching circuit may be triggered which indicates that an attack has occurred. In various embodiments, once triggered, the latching circuit will irreversibly indicate (e.g., at least until the container has been reset through the use of a password or code) that a tampering attack has occurred until the system has had a hard reset.

In various embodiments, the resistance monitoring circuit 510 may include a summation circuit (e.g., a "sum and fire" circuit) to encode the integrity status of multiple sections of the container into a single output. If the cumulative readings from a section reach a threshold indicative of an attack, the summation circuit provides an output indicative of tampering to the microprocessor.

For example, the processor 505 may receive signals from the resistance monitoring circuit 510 indicating whether the container 100, 200, 300-320 has been tampered with. The processor 505 may then utilize connectivity circuit 550 to report the state of health of the container 100, 20, 300-320, and may also provide the current location provided by the GPS 555. In various embodiments, encryption and authentication schemes may be utilized to ensure that communications from the monitoring circuit 500 are secure. These features would reduce the risk of an attacker from defeating the electronic monitor and control system and would also serve to prevent an attacker from making a substitute counterfeit container and simply substituting it for the real container without detection.

In various embodiments, the resistance monitoring circuit 510 may be substituted with or supplemented with additional monitoring circuits configured to interface with integrity sensors. For example, in various embodiments, the integrity sensors may include fiber optic filaments and the monitoring circuit 500 may include optical sensors configured to measure light passing through the fiber optic filaments. In various embodiments, the integrity sensors my include piezoelectric senders and receivers configured to generate vibration energy in the container walls and measure the vibration energy to determine if the walls have been altered.

In various embodiments, the monitoring circuit 500 may be configured to analyze various other sensor to determine whether the container 100, 200, 300-320 is being mistreated or in an improper environment and utilize the connectivity circuit 550 to provide updated state of health reports. For example, the accelerometers, vibration, and shock detectors 515 may be utilized to determine if the container has been handled improperly. Similarly, a water detection circuit 520 and an environmental conditions detection circuit 525 may be used to determine the environmental conditions of the container 100 and provide feedback if the container 100 has been stored in an improper environment (e.g., in conditions that are too hot, too cold, or too wet).

In various embodiments, the environmental conditions detection circuit 525 may be configured to measure the temperature, humidity and pressure of the environment of the container 100. In various embodiments, the monitoring circuit 500 may be configured to alter various thresholds based on the environmental conditions. For example, the container may expand or contract based on temperature, humidity, and or pressure. Thus, the resistance of the integrity sensors may be altered based on the changes in environmental conditions. The monitoring circuit 500 may measure the environmental conditions and determine when the thresholds in the resistance monitoring circuit 510 need to be modified. The monitoring circuit 500 may then adjust various thresholds in the resistance monitoring circuit 510 accordingly. For example, in various embodiments, the monitoring circuit 500 may monitor the environmental conditions over a period of time to determine if the conditions will affect the resistance of the integrity sensors. For example, how the container is affected by the temperature/humidity may be dependent on the length of time that the container 100 is at the temperature/humidity.

In various embodiments, the monitoring circuit 500 may be configured to analyze various other anti-probing sensors to determine whether the container 100, 200, 300-320 is being probed for weaknesses by an attacker. For example, in various embodiments, the monitoring circuit 500 may include an electromagnetic interference detection circuit 530 which may be utilized to detect when an attacker is attempting to see inside the container or the conductive filament geometry. Similarly, an RF/EMI detection circuit 540 and an X-Ray detection circuit 535 may also be included to determine if an attacker is attempting to probe the container to determine its contents or assess the properties of the integrity sensors.

Figure 6:
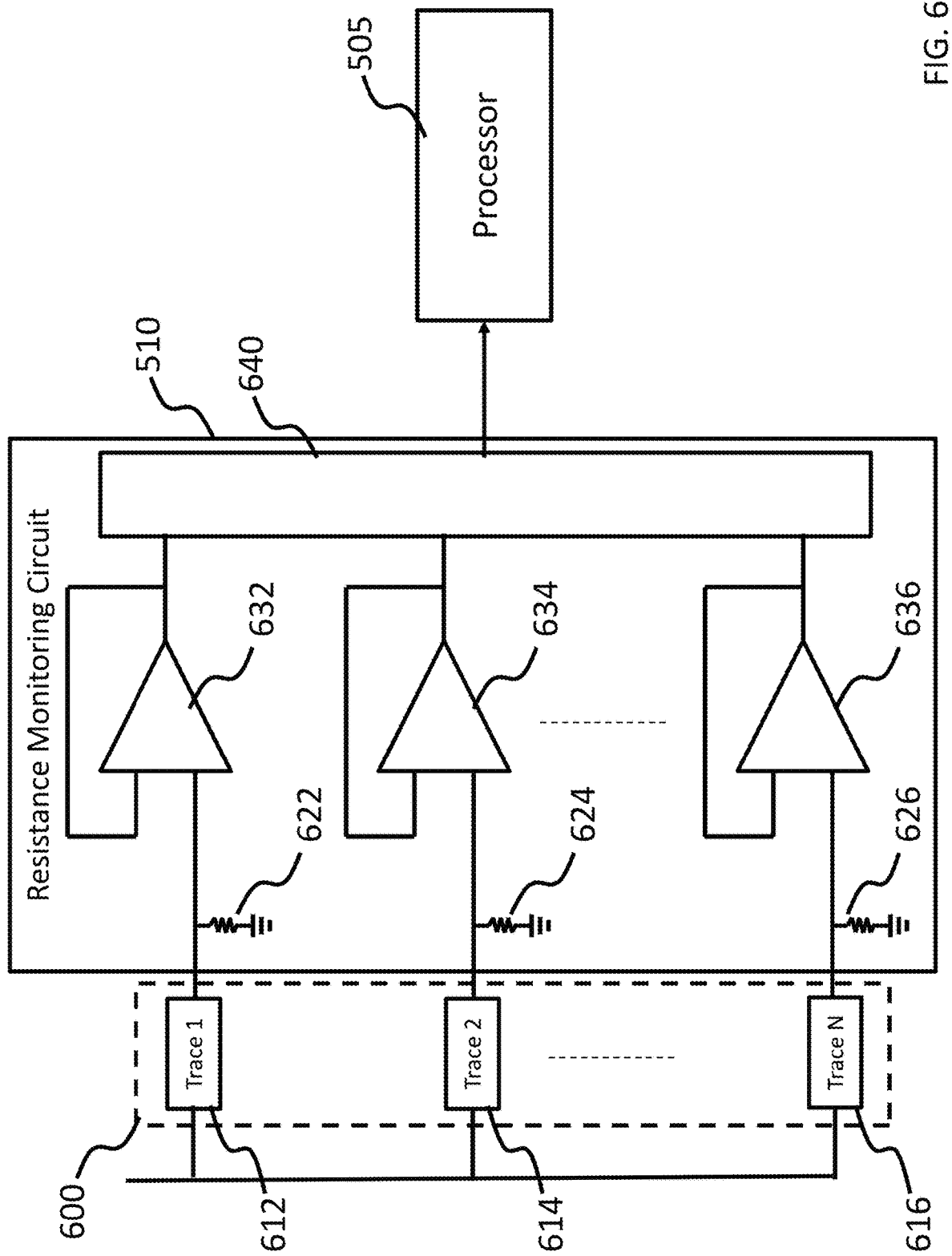
FIG. 6 depicts a block diagram of a resistance monitoring circuit according to various embodiments.

FIG. 6 depicts a block diagram of a resistance monitoring circuit according to various embodiments.

Referring to FIG. 6, in various embodiments, the resistance monitoring circuit 510 is connected to one or more conductive traces 600 that are embedded in the body of a container. For example, a container may include a first conductive trace 612, a second conductive trace 614 and an Nth conductive trace 616. In various embodiments, the resistance monitoring circuit 510 is connected to each conductive trace 612, 614, 616 and configured to facilitate the measurement of the resistance of each conductive trace 612, 614, 616. For example, the resistance monitoring circuit 510 may include a resistor 622, 624, 626 connected in series with each conductive trace 612, 614, 616 (i.e., to form a voltage divider). A comparator 632, 634, 636 may be connected at a node between each of the conductive traces 612, 614, 616 and the corresponding resistors 622, 624, 626. Because the resistance of each resistor 622, 624, 626 is known, the resistance of the conductive traces 612, 614, 616 may be measured. For example, the comparators 632, 634, 636 may be configured to provide an output when the measured voltage drops below a threshold (i.e., a threshold that indicates the increase of resistance of a conductive trace 612, 614, 616 has increased enough to indicate a breach). In various embodiments, the output of the comparators 632, 634, 636 may be provided to processor 505. In various embodiments, a summing circuit 640 may be encode the integrity status of multiple conductive traces 612, 614, 616 into a single output to the processor 505.

In various embodiments, the resistance monitoring circuit 510 may not include comparators and instead may include any suitable alternative circuitry for measuring the resistance of the integrity sensors 500. For example, the voltage of each voltage divider may be provided to an analog to digital converter (ADC) and the digital voltages may be provided to the processor 505 for processing. In other embodiments, the processor 505 may be directly connected to the voltage dividers and the processor 505 may measure the resistance of the conductive traces 600.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A tamper evident container comprising:
   a container body having a bottom, a sidewall, and a top, that surround a cavity, wherein the container body comprises a non-electrically conductive material and at least one integrity sensor embedded in the non-electrically conductive material, wherein the at least one integrity sensor comprises a path generated using a space-filling, self-avoiding, random walk algorithm; and
   a monitoring circuit configured to monitor the tamper evident container by measuring a resistance of each of the at least one integrity sensor and determine a state-of-health of the tamper evident container based on each resistance.

2. The tamper evident container of claim 1, further comprising a first contact pad on the sidewall and a second contact pad on the top, wherein the first contact pad and the second contact pad are configured to electrically connect a first integrity sensor located in the sidewall to a second integrity sensor located in the top.

3. The tamper evident container of claim 2, wherein the first integrity sensor comprises a first length and the second integrity sensor comprises a second length that is different than the first length.

4. The tamper evident container of claim 2, wherein the first integrity sensor comprises a first thickness and the second integrity sensor comprises a second thickness that is different from the first thickness.

5. The tamper evident container of claim 2 wherein the first integrity sensor comprises at least one of a variable thickness and a variable material composition.

6. The tamper evident container of claim 1, wherein the monitoring circuit comprises a resistance monitoring circuit connected to the at least one integrity sensor and is configured to measure the resistance of each of the at least one integrity sensor to determine the state-of-health.

7. The tamper evident container of claim 6, wherein the monitoring circuit further comprises:
   an accelerometer and a global positioning system circuit, wherein an output the accelerometer and an output of global positioning system circuit are used to determine the state-of-health; and
   at least one countermeasure and the monitoring circuit is configured to activate the countermeasure based upon the state-of-health.

8. The tamper evident container of claim 1, wherein the monitoring circuit comprises at least one anti-probing sensor configured to determine a probing attack on the tamper evident container, and wherein the monitoring circuit is configured to update the state-of-health according to an occurrence of the probing attack.

9. A method of manufacturing a tamper evident container comprising:
   receiving a tamper evident container shape;
   generating at least one conductive trace pattern for placement in a wall of the tamper evident container shape using a space-filling, self-avoiding, random walk algorithm; and
   building the tamper evident container based on the tamper evident container shape using an additive layer technique that integrates the at least one conductive trace pattern into a wall of the tamper evident container shape as at least one conductive trace.

10. The method of claim 9, further comprising programming a monitoring circuit of the tamper evident container with a resistance of each of the at least one conductive trace.

* * * * *